E. M. STONE.
RUDDER TELLTALE.
APPLICATION FILED MAR. 26, 1909.
945,819.
Patented Jan. 11, 1910.
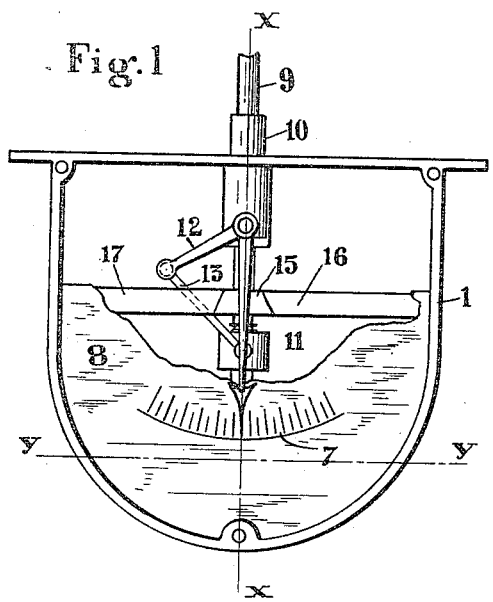
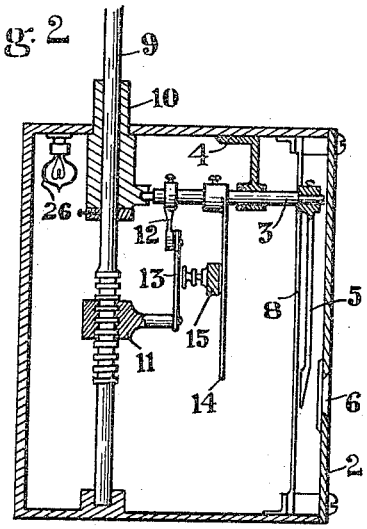
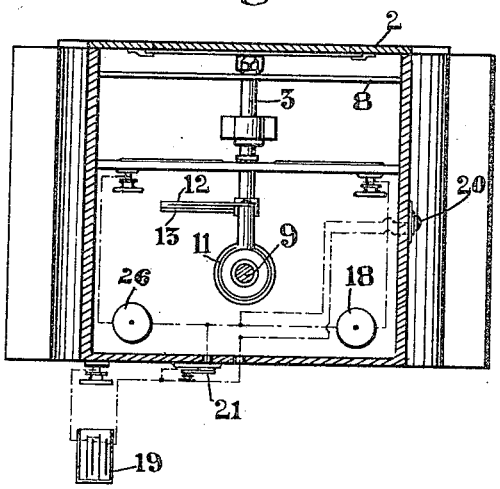
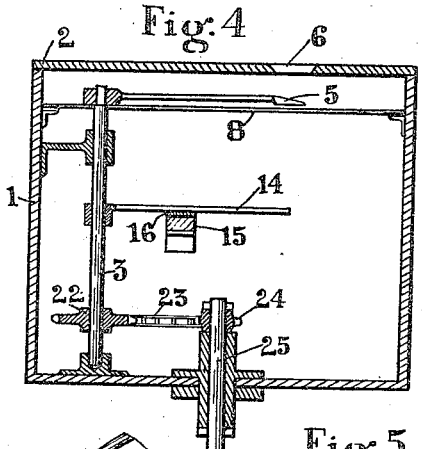
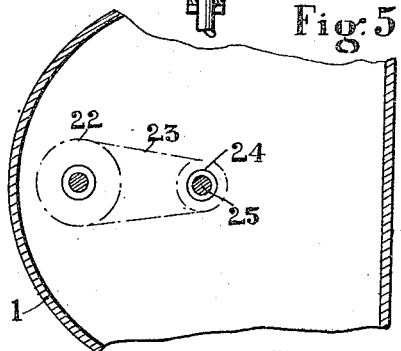
WITNESSES:
INVENTOR
EDWIN M. STONE
BY
ATTORNEYS

UNITED STATES PATENT OFFICE.

EDWIN M. STONE, OF DETROIT, MICHIGAN.

RUDDER-TELLTALE.

945,819.  Specification of Letters Patent.  Patented Jan. 11, 1910.

Application filed March 26, 1909. Serial No. 486,036.

*To all whom it may concern:*

Be it known that I, EDWIN M. STONE, a citizen of the United States of America, residing at Detroit, in the county of Wayne and State of Michigan, have invented certain new and useful Improvements in Rudder-Telltales, of which the following is a specification, reference being had therein to the accompanying drawings.

This invention relates to a tell-tale for a ship's rudder and more especially to an arrangement thereof whereby the position of the rudder may be readily noted at night without the use of any light in the wheelhouse which momentarily blinds the helmsman and prevents his observing outer objects.

The invention consists in the matters hereinafter set forth, and more particularly pointed out in the appended claims.

In the drawings, Figure 1 is a plan view, substantially full size, of a tell-tale embodying features of the invention with a cover removed and a shield partly broken away. Fig. 2 is a view in section on line $x$—$x$ of Fig. 1. Fig. 3 is a view in section on line $y$—$y$ of Fig. 1 with a diagrammatic plan of electrical connections. Figs. 4 and 5 are detail views of a modified form of the device.

Referring to the drawings, an outer casing 1 of suitable material and design, that is closed by a removable cover 2, has a spindle journaled in a bearing bracket 4, or the like, which carries an indicator or index arm 5. The outer end of the latter which swings parallel to and underneath the cover 2, may be seen through a segmental slot 6 in the cover, and its angular position noted by a suitable scale 7 reading in degrees and any desired fraction thereof, which is on a shield 8 or plate of translucent material such as ground glass, celluloid or the like, suitably supported in the casing below the index arm 5 and forming a cross-wall.

The indicator spindle is swung in unison with the ship's rudder through any suitable means, as for example, a shaft 9 journaled in a bearing 10 (which in the construction shown, forms a convenient step bearing for the spindle 3) that extends without the casing and is operatively connected by any preferred manner, gearing or sprocket chain to the steering gear. A bushing 11 has screw-threaded engagement with the shaft within the casing and turns the spindle 3 as it travels back and forth on the shaft, through the medium of a rock-arm 12 and link 13, the operating parts being so adjusted that any movement of the ship's rudder is reproduced by the indicator arm.

A spring metal strip or contact finger 14 parallel to the indicator arm, is secured on the spindle 3 so as to have sliding contact with the face of a transverse bar 15 of insulating material on which are two contact plates 16 and 17 so disposed that when the rudder and consequently the indicator are set either to port or starboard more than one or two points off amidships, the finger rests on one or the other of the contacts.

A red electric incandescent light 26 and a corresponding green bulb 18 of quite low candle power so as to be operated by a battery cell or two or other low tension available current are placed in the casing. Each light is connected in series through suitable conductors with the adjacent contact strip and the two lights with their strips are in parallel in one limb of a circuit of a battery 19 as indicated in Fig. 3, the other limb including the casing and contact arm. A pair of switches, one of which 20 is of the push button, temporary or open circuit type and the other of which 21 is of the swing lever or set type, are introduced in parallel in the circuit so that the lights may be thrown in momentarily or left permanently in, to glow if the contact finger closes the circuit.

The spindle 3 may be operated through a sprocket wheel 22 chain 23 and pinion 24 by a shaft 25, this latter construction allowing the tell-tale to be placed on top of a binnacle stand.

In operation, the indicator arm swings with the rudder and the position of the latter may be instantly seen in daylight. At night, by closing the light circuit, the scale remains dark if the rudder is amidships or only a point or two therefrom, depending on the width of the gap between the contact plates. If the rudder is to port, the red light illuminates the translucent shield thus showing instantly the general position of the rudder, while the indicator gives the exact angular deflection. If the rudder helm is to starboard, the shield glows green. Even in daylight the appropriate conventional color corresponding to the position of the rudder is seen if the switch be closed. In no instance is there any bright light shown, so that the wheelsman is not momentarily prevented from seeing objects at a distance from his post, as is the case where a light is turned on in a wheel house. No special arrangement is necessary for equipping a vessel with it.

Obviously, changes in the details of construction may be made without departing from the spirit of the invention, and I do not care to limit myself to any particular form or arrangement of parts.

What I claim as my invention is:—

1. A rudder tell-tale comprising a casing, an indicator arm movable therein, a translucent scale traversed by the arm, an appropriately colored port light in the casing below the scale, an appropriately colored starboard light in the casing below the scale, means adapted, when operatively connected to the steering gear of a vessel, to turn the arm in unison with the rudder moved by the gear, and means adapted when the rudder is at port to turn the port light on, and to turn the starboard light on, when the rudder is starboard.

2. A rudder tell-tale comprising a casing, an indicator arm movable therein, a translucent scale traversed by the arm, an appropriately colored port light in the casing below the scale, an appropriately colored starboard light in the casing below the scale, means adapted, when operatively connected to the steering gear of a vessel, to turn the arm in unison with the rudder moved by the gear, and means controlled by the turning means and adapted when the rudder is at port to turn the port light on, and to turn the starboard light on, when the rudder is at starboard.

3. A rudder tell-tale comprising a casing, an indicator arm movable therein, a scale in the casing traversed by the arm, an appropriately colored port electric light in the casing, an appropriately colored starboard electric light in the casing, means adapted when operatively connected to a vessel's steering gear, to turn the arm in unison with the rudder worked by the gear, and means controlled by the arm turning means and adapted to close an electric circuit through the port light when the indicator is at port and through the starboard light when the indicator is at starboard, and to open the circuit when the rudder is amidships.

4. A rudder tell-tale comprising a closed casing provided with a view slot, an indicator arm behind the slot, mechanism in the casing with an outer member for connection with a vessel's steering gear, adapted when so connected to move the arm in unison with the rudder turned by the steering gear, appropriately colored port and starboard lights in the casing, means controlled by the arm operating mechanism adapted to throw on the port light when the arm is port and the starboard light when the arm is starboard and to cut off both lights when the arm is amidships, and a translucent shield forming a partition in the casing between the lights and arm and having a scale registering with the view slot, whereby the scale is colored to correspond to the position of the arm.

5. A rudder tell-tale comprising a closed casing having a view slot in one side, a spindle journaled in the casing, an indicator arm on the spindle traversing the slot, a pair of insulated contact plates in the casing, a contact finger on the spindle moving with the arm adapted to slidably engage one plate when turned one way and the other plate when turned oppositely, an appropriately colored port electric light in the casing connected in series with one plate, an appropriately colored starboard electric light in series with the other plate, the lamps and their plates being in parallel in one limb of an electric circuit that includes the contact finger, a rotatable shaft extending through the casing wall, means operatively connecting the spindle and shaft to turn the spindle when the shaft is rotated, the parts being adapted to throw the port light into circuit when the indicator arm is swung to the left and the other light when the arm is swung to starboard.

In testimony whereof I affix my signature in presence of two witnesses.

EDWIN M. STONE.

Witnesses:
CLEMENT R. STICKNEY,
A. M. SHANNON.